(No Model.) 4 Sheets—Sheet 2.
E. S. STAPLES & R. H. ARNOLD.
STEAM GENERATOR.
No. 440,285. Patented Nov. 11, 1890.
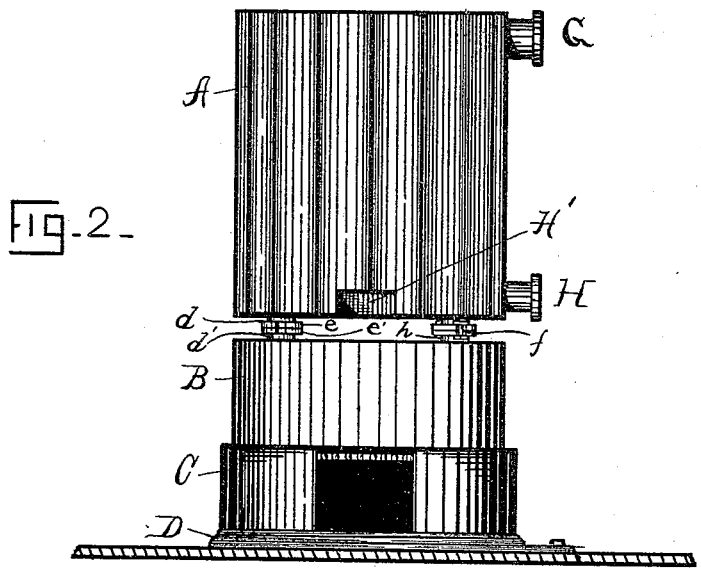
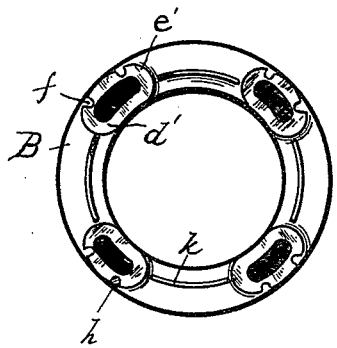
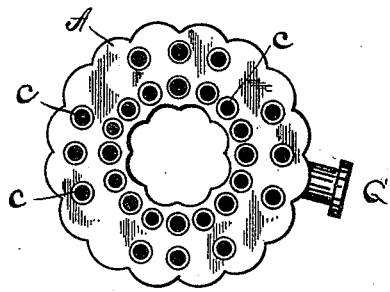
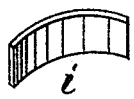
Witnesses
Allen Tenny
Alonzo M. Luther
Inventors
Elisha S. Staples
Roush H. Arnold
By their Attorney
Frank H. Allen (No Model.) 4 Sheets—Sheet 3.

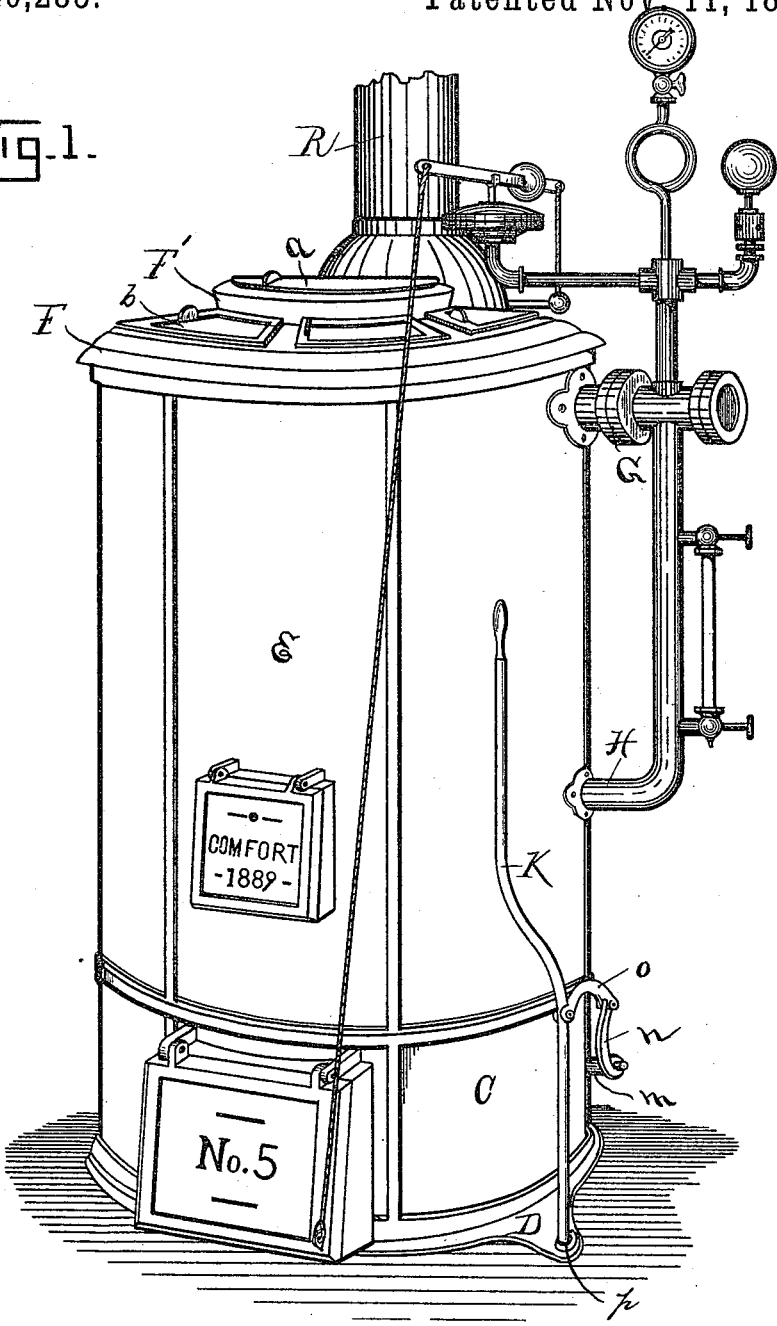

E. S. STAPLES & R. H. ARNOLD.
STEAM GENERATOR.

No. 440,285. Patented Nov. 11, 1890.

Witnesses
Alonzo M. Luther.
Allen Tenny.

Inventor
Elisha S. Staples
Rouse H. Arnold
By their Attorney
Frank H. Allen.

THE NORRIS PETERS CO., PHOTO-LITHO., WASHINGTON, D. C.

(No Model.) 4 Sheets—Sheet 4.
E. S. STAPLES & R. H. ARNOLD.
STEAM GENERATOR.
No. 440,285. Patented Nov. 11, 1890.
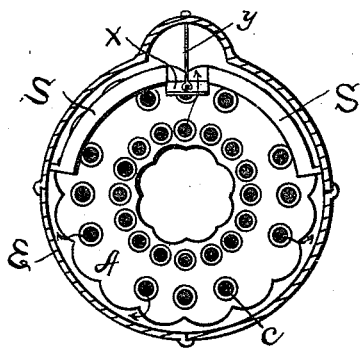
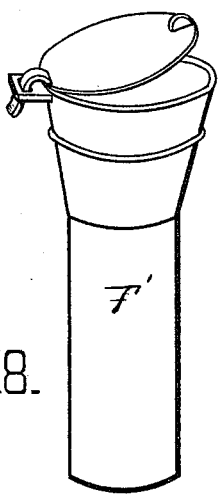
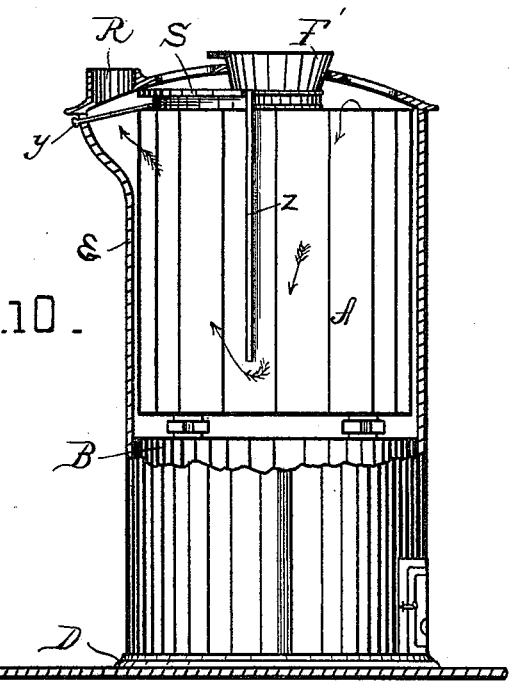
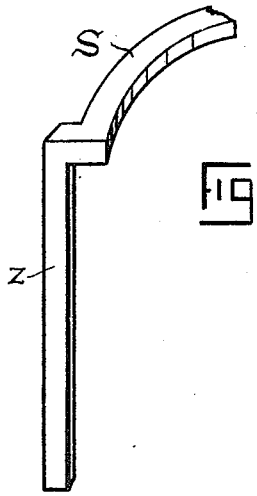
Witnesses
Allen Tenney.
Alonzo M. Luther.
Inventors
Elisha S. Staples
Rouse H. Arnold
By their Attorney
Frank H. Allen.

UNITED STATES PATENT OFFICE.

ELISHA S. STAPLES AND ROUSE H. ARNOLD, OF SENECA FALLS, NEW YORK.

STEAM-GENERATOR.

SPECIFICATION forming part of Letters Patent No. 440,285, dated November 11, 1890.

Application filed July 12, 1889. Serial No. 317,304. (No model.)

*To all whom it may concern:*

Be it known that we, ELISHA S. STAPLES and ROUSE H. ARNOLD, citizens of the United States, residing at Seneca Falls, in the county of Seneca and State of New York, have made certain new and useful Improvements in Steam-Generators, which improvements are fully set forth and described in the following specification, reference being had to the accompanying four sheets of drawings.

On the 15th day of September, 1885, Letters Patent of the United States, No. 326,186, were issued jointly to Maturin M. Whittemore and the present applicants for a steam-generator for heating purposes, the arrangement of whose elementary parts was similar to upright tubular boilers as commonly used for generating steam for power purposes.

Our present invention is in the same class of generators, and has for its immediate object the improvement of certain details of construction, to the end that the complete generator may be more efficient in operation and its several parts more readily assembled. Said improvements, briefly stated, consist, first, of tubular connections or water-legs between the boiler and fire-pot sections, having combined therewith segmental plates that are located and supported between the above-named tubular connections to close the otherwise open spaces between the boiler and fire-pot, and, second, a system of plates and dampers for deflecting, when desired, the current of hot air within and around the boiler-section to provide an indirect draft.

Figure 6:
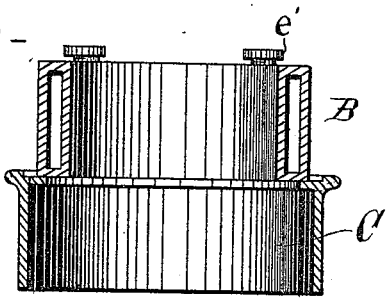
Figure 7:
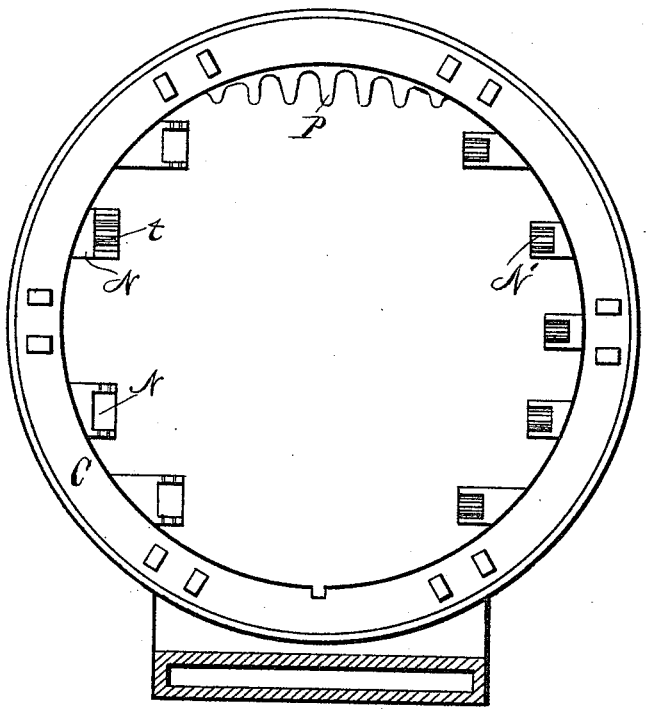

Referring to the annexed drawings, Figure 1 is a perspective view of a complete steam-generator of our new construction. Fig. 2 shows certain of the interior parts of such a generator set up. Fig. 3 is a top end view of the fire-pot; Fig. 4, a top end view of the boiler-section, and Fig. 5 a perspective view of one of the segmental plates provided to fill the otherwise open space between said fire-pot and boiler. Fig. 6 is a central vertical sectional view of the ash-pit and fire-pot sections. Fig. 7 is a plan view of the ash-pit section. Fig. 8 is a perspective view of the magazine that is provided to receive a supply of coal. Fig. 9 is a top view of the generator with coal-magazine and cap-section removed to expose to view the plates and damper, by means of which an indirect draft may be attained; and Fig. 10 is an elevation of a generator with the outer shell partly cut away to show said plates. In Fig. 11 we have shown, enlarged, a perspective view of a portion of one form of said plates, and in Fig. 12 a perspective view of a modified form of said plate.

In the drawings, the letters A, B, C, and D indicate, respectively, the boiler, fire-pot, ash-pit, and base sections, said parts being superimposed in the order named, and a complete generator, as illustrated in Fig. 1, is surrounded by a shell E, composed, preferably, of several companion sections, which when assembled form a cylindrical jacket around the several superimposed sections.

The several jacket-sections preferably rest at the lower end within an annular rib on the ash-pit C, and are held at the upper end against accidental displacement by a cap-section F, which rests on said jacket and may, if desired, be formed with an integral flange or rim that fits down over said cap-section substantially like a box-cover. This cap-section F is formed with a central circular opening, in which is suspended a coal-magazine F', said magazine being of length sufficient to extend downward in the boiler-section nearly to the fire-pot, and is provided at its upper or exposed end with a cover $a$, that may be readily removed or raised to allow said magazine to be filled with coal. The cap-section F is also provided with a series of openings concentric with the central opening last described, which, in practice, are closed by removable covers $b$, loosely laid thereon, the said series of openings being of such size that when they are removed nearly the entire upper end of the boiler-section A is exposed to view. The object of these concentric openings is to provide a ready and practicable means of reaching said boiler to clean or brush out its vertical flues.

The boiler-section is constructed substantially like that in Patent No. 326,186, above referred to—that is to say, it is of the general form of a cylinder with corrugated outer and inner walls and provided with a multiple of draft-tubes $c$. The cylindrical shell of said boiler is formed, preferably, of cast-iron, and the tubes are preferably steel or other serviceable metal, swaged, riveted, or screwed in place at their upper and lower ends. Convenient outlet and inlet pipes are connected with said boiler at G H.

Referring now particularly to Figs. 2, 3, 6, and 10, it will be seen that said boiler-section A is formed with a multiple of cored projections $d$ at its lower end coincident with similar projections $d'$, formed at the upper end of the fire-pot section B. Flanges $e$ and $e'$ are formed, respectively, on said projections $d$ and $d'$; these flanges being provided with slots $f$, so located that when the boiler is raised to its position on the fire-pot the slots in confronting flanges are coincident, and when so arranged bolts $h\ h$ may be slipped into said slots and their respective nuts turned home to clamp said boiler and fire-pot firmly together. This manner of forming the connecting water-legs and of inserting the clamping-bolts we find is much cheaper in practice and more convenient and practical than to cast the flanges of the water-legs entire, and then to drill for said bolts, as has sometimes been done heretofore.

The described method of uniting the boiler and the fire-pot leaves a considerable space open between the water-leg connections, and this we fill cheaply by inserting a series of plates $i$, formed as segments of a circle. (See Fig. 5.) To hold these plates $i$ against displacement, either the boiler-section or the fire-pot or both of said parts may be cast with arc-shaped channels $k$, as in Fig. 3, in which channels or depressions the said plates $i$ rest. When the described parts are assembled, the arc-shaped channels support the plates $i$ in proper position, and thus close the otherwise open space.

The fire-pot section B rests on ash-pit C, said fire-pot being formed as a hollow cast-iron annular chamber serving the double purpose of a fire-pot and a water-jacket encircling the fire, and thus bringing a considerable portion of the water into such close connection with the fire that the steam is quickly generated. An opening H' is provided in the boiler, through which the fire may be viewed or reached when necessary.

A steam-generator as thus far described provides for a direct draft upward through the tubular flues $c$ and through the space around the coal-magazine provided by the corrugated form of the interior of the boiler-section A. When so formed and constructed, the heated air passes directly off through the smoke-pipe R. It is frequently desirable to check this draft and cause it to circulate around the boiler-section, and this we accomplish by placing one or more plates S around the rear side of the upper end of the boiler, which plates may be provided at their ends with depending wings or bars $z$, that extend downward nearly to the bottom of said boiler, and thus close the space between said boiler and its inclosing-shell E. The plates S are of such shape that they rest on the boiler and extend upward to the cap-section, (see Fig. 10,) so that they fill the space between said boiler and the cap at the rear side of the generator and prevent the escape of heated air and smoke in that direction. Instead of forming the vertical wings $z$ as a part of the plates S, said wings may be integral parts of the boiler-section, in which case it is only necessary to provide at the top, in place of plates S, simple curved plates $S^2$, as shown in Fig. 12. When plates $S^2$ are used, they may be readily removed whenever it becomes necessary to clear out the space between the outer shell and the boiler section. We prefer to make right and left hand plates S, (instead of providing a single plate that would include the whole space that is desired to cover,) and between the confronting ends of these right and left hand sections we hinge a damper $x$, that is operated by a rod $y$, extending outward through the shell E at the rear side of the generator. When a direct draft is desired, this damper $x$ is opened and the hot air and smoke pass directly through said damper-opening and up the pipe R. When an indirect draft is desired, it is only necessary to close said damper, when the hot air, being checked, must of necessity pass downward between the boiler and the outer shell at the front side of the boiler, thence around the lower end of the depending wings $z$, and finally upward to and through the smoke-pipe R, as indicated by the arrows in Fig. 10. The several elementary parts of our described generator are so formed and the connections such that they may be brought from the foundry and assembled with scarcely any fitting, thus enabling us to produce at greatly reduced cost a practicable and serviceable generator. The various pipe-connections and the arrangements of gages, safety-valve, and automatic damper are substantially the same as in other generators for heating purposes, and are clearly illustrated in Fig. 1 of the drawings.

Having thus described our invention, we claim—

1. In combination with a boiler and fire-pot section, each provided with coincident water-legs, as set forth, a series of intervening segmental plates, as described, to close the space between said boiler and fire-pot.

2. In combination with a boiler-section, an inclosing-jacket, a cap-section seated on said jacket, as set forth, plates for checking and deflecting the current of hot air, located between a portion of the upper end of said boiler and the adjacent cap-section, downwardly-extending wings or ribs $z$ on each side of said boiler, as set forth, and a damper connecting the smoke-pipe and the open space above the boiler, all substantially as described, and for the object specified.

ELISHA S. STAPLES.
ROUSE H. ARNOLD.

Witnesses:
JASPER N. HAMMOND,
CHARLES T. SILSBY.